United States Patent
Hartzell et al.

(10) Patent No.: US 11,932,759 B1
(45) Date of Patent: Mar. 19, 2024

(54) POLYMER-FILLER COMPOSITES WITH GUAYULE RUBBER

(71) Applicant: Bridgestone Corporation, Tokyo (JP)

(72) Inventors: Michael R. Hartzell, Gold Canyon, AZ (US); Robert W. White, Gilbert, AZ (US); Piotr Kozminski, Akron, OH (US); Mark N. Dedecker, North Canton, OH (US); Erin Sheepwash, Cuyahoga Falls, OH (US); Yingyi Huang, Hudson, OH (US); William S. Niaura, Mesa, AZ (US)

(73) Assignee: Bridgestone Corporation, Chuo-ku (JP)

( * ) Notice: Subject to any disclaimer, the term of this patent is extended or adjusted under 35 U.S.C. 154(b) by 150 days.

(21) Appl. No.: 17/562,511

(22) Filed: Dec. 27, 2021

Related U.S. Application Data

(60) Provisional application No. 63/131,082, filed on Dec. 28, 2020.

(51) Int. Cl.
   *C08L 7/00* (2006.01)
   *C08J 3/22* (2006.01)
   *C08J 3/24* (2006.01)

(52) U.S. Cl.
   CPC .............. *C08L 7/00* (2013.01); *C08J 3/226* (2013.01); *C08J 3/24* (2013.01); *C08J 2307/00* (2013.01); *C08J 2400/26* (2013.01)

(58) Field of Classification Search
   CPC ...... C08L 7/00; C08J 3/226; C08J 3/24; C08J 2307/00; C08J 2400/26
   See application file for complete search history.

(56) References Cited

U.S. PATENT DOCUMENTS

| | | | |
|---|---|---|---|
| 2,617,782 A | 11/1952 | Paton et al. | |
| 2,721,185 A | 10/1955 | Schulze et al. | |
| 3,317,458 A | 5/1967 | Willi et al. | |
| 3,709,958 A | 1/1973 | Burleigh | |
| 3,824,206 A | 7/1974 | Baranwal et al. | |
| 4,305,851 A | 12/1981 | Tominaga et al. | |
| 4,561,657 A | 12/1985 | Tominaga et al. | |
| 4,578,411 A | 3/1986 | Budd et al. | |
| 4,838,556 A | 6/1989 | Sullivan | |
| 5,006,603 A | 4/1991 | Takaki et al. | |
| 5,018,740 A | 5/1991 | Sullivan | |
| 5,131,662 A | 7/1992 | Pollitt | |
| 5,227,425 A | 7/1993 | Rauline | |
| 5,268,439 A | 12/1993 | Hergenrother et al. | |
| 5,332,810 A | 7/1994 | Lawson et al. | |
| 5,508,350 A | 4/1996 | Cadorniga et al. | |
| 5,697,856 A | 12/1997 | Moriyama et al. | |
| 5,717,022 A | 2/1998 | Beckmann et al. | |
| 5,719,207 A | 2/1998 | Cohen et al. | |
| 5,786,441 A | 7/1998 | Lawson et al. | |
| 5,866,171 A | 2/1999 | Kata | |
| 5,876,527 A | 3/1999 | Tsuruta et al. | |
| 5,919,862 A | 7/1999 | Rajagopalan | |
| 5,931,211 A | 8/1999 | Tamura | |
| 5,971,046 A | 10/1999 | Koch et al. | |
| 5,971,869 A | 10/1999 | Rajagopalan et al. | |
| 5,981,658 A | 11/1999 | Rajagopalan et al. | |
| 5,998,506 A | 12/1999 | Nesbitt | |
| 6,004,226 A | 12/1999 | Asakura | |
| 6,025,450 A | 2/2000 | Lawson et al. | |
| 6,046,288 A | 4/2000 | Lawson et al. | |
| 6,048,923 A | 4/2000 | Mabry et al. | |
| 6,054,525 A * | 4/2000 | Schloman, Jr. ........... | C08L 7/02 524/925 |
| 6,071,201 A | 6/2000 | Maruko | |
| 6,127,468 A | 10/2000 | Cruse et al. | |
| 6,204,339 B1 | 3/2001 | Waldman et al. | |
| 6,334,820 B1 | 1/2002 | Sasaki et al. | |
| 6,394,915 B1 | 5/2002 | Nesbitt | |
| 6,528,673 B2 | 3/2003 | Cruse et al. | |
| 6,596,797 B2 | 7/2003 | Nesbitt | |
| 6,635,700 B2 | 10/2003 | Cruse et al. | |
| 6,649,684 B1 | 11/2003 | Okel | |
| 6,683,135 B2 | 1/2004 | Cruse et al. | |
| 6,943,208 B2 | 9/2005 | Higuchi et al. | |
| 9,988,502 B2 | 6/2018 | Adler et al. | |
| 2013/0172446 A1 | 7/2013 | Smale et al. | |
| 2019/0048150 A1 | 2/2019 | Adler et al. | |

FOREIGN PATENT DOCUMENTS

| | | |
|---|---|---|
| CA | 886611 | 11/1971 |
| EP | 0009250 | 4/1980 |
| EP | 0890606 | 1/1999 |
| JP | 52-145486 | 3/1982 |
| JP | 03-281642 | 12/1991 |
| JP | 61-130357 | 10/1993 |
| JP | 2000-063566 | 2/2000 |
| WO | 200134658 | 5/2001 |

OTHER PUBLICATIONS

Bera, Madhab, Structural/Load-Bearing Characteristics of Polymer-Carbon Composites—Oct. 2018, Research Gate, Pub 327100387.*
Machine translation for Japan 2000-063566 (no date).
M.-J. Wang, et al. NR/Carbon Black Masterbatch Produced with Continuous Liquid Phase Mixing. Elastomers and Plastics. KGK Kautschuk Gummi Kunststoffe 55. Jahrgang, Nr. 7-8.2002 pp. 388-396.

* cited by examiner

*Primary Examiner* — Ling Siu Choi
*Assistant Examiner* — Olga Lucia Donahue
(74) *Attorney, Agent, or Firm* — Meredith E. Hooker; Arthur M. Reginelli

(57) ABSTRACT

A method for forming a polymer-filler composite having advantageous bound filler content, the method comprising (a) providing a guayule cement; (b) introducing particulate filler to the guayule cement to form a solution masterbatch; and (c) desolventizing the solution masterbatch to form a polymer-filler composite.

20 Claims, No Drawings

POLYMER-FILLER COMPOSITES WITH GUAYULE RUBBER

PRIORITY

This application claims the benefit of U.S. Provisional Application Ser. No. 63/131,082 filed on Dec. 28, 2020, which is incorporated herein by reference.

FIELD OF THE INVENTION

Embodiments of the present invention are directed toward methods for preparing polymer-filler composites from guayule cement. According to embodiments of the invention, the polymer and filler are combined in solution to form a mixture, and then the mixture is subsequently desolventized to form the composites, which are useful in preparing vulcanizable compositions such as those useful in manufacturing tire components.

BACKGROUND OF THE INVENTION

Vulcanizable rubber compositions, such as those that are useful in the manufacture of tires, are typically prepared by mixing vulcanizable polymers with fillers, such as carbon black and silica, as well as other additives such as processing aids and curatives. These compositions are typically solid-state or dry mixed using internal mixing devices that are adapted to impart high shear to the compositions.

It has been proposed to pre-mix one or more of the ingredients with the vulcanizable rubber in the presence of water. This technique, which is referred to as a wet masterbatch technique, typically combines a polymer latex with an aqueous slurry in which the particulate filler is dispersed or suspended. For example, U.S. Publ. No. 2019/0048150 teaches a wet masterbatch technique wherein an elastomer latex fluid and a particulate slurry fluid are combined. The mixture is then coagulated to form a masterbatch crumb that is the dewatered and further processed by dry mixing techniques.

Solution masterbatch techniques have also been proposed. According to these techniques, the vulcanizable polymers are dissolved in a solvent and combined with additives such as particulate filler and then desolventized, have also been proposed. For example, U.S. Publ. No. 2013/0172446 teaches a method where a polymer cement and a filler are mixed to form a solution masterbatch. The solution masterbatch is then desolventized to form a crumb polymer composition. The crumb is then combined with a low viscosity polymeric or oligomeric liquid and mixed by intermeshing mixing in order to reduce the particle size of the particulate filler since solution mixing is unable to impart adequate shear to reduce filler agglomerates. The filler may include carbon black with a surface area of at least 20 $m^2/g$, and the use of unpelletized carbon black led to greater dispersions. The polymer solution that is combined with the carbon black has a polymer concentration of about 5 to about 80 wt %. Desolventization can be accomplished by drum drying, extruder drying, vacuum drying, spray drying, and steam desolventization.

Natural rubber, which is in the form of cis-1,4-polyisoprene, is found in latex form within various trees, shrubs and plants, e.g., Hevea *brasiliensis*, (i.e., the Amazonian rubber tree), *Castilla elastica* (i.e., the Panama rubber tree), various *Landophia* vines (*L. kirkii, L. heudelotis*, and *L. owariensis*), various dandelions (i.e., *Taraxacum* species of plants), and *Parthenium argentatum* (guayule shrubs). The latex of the guayule shrub is trapped intracellularly in the plant cells, which is contrast to other sources, such that of the Heavea tree, which is trapped intercellularly. As a result, guayule shrub plant cells must be ruptured to obtain the natural latex. The product obtained from guayule shrub is therefore believed to be unique from at least the standpoint that it contains several constituents, such as resin and low molecular weight polymers. Several purification techniques have been developed to isolate the high molecular weight fractions cis-1,4-polyisoprene, which enables use of the rubber in industrially significant uses.

SUMMARY OF THE INVENTION

One or more embodiments of the present invention provide a method for forming a polymer-filler composite having advantageous bound filler content, the method comprising (a) providing a guayule cement; (b) introducing particulate filler to the guayule cement to form a solution masterbatch; and (c) desolventizing the solution masterbatch to form a polymer-filler composite.

Yet other embodiments of the present invention provide a method for forming a vulcanizable composition, the method comprising combining the polymer-filler composite of claim 1 with a curative.

DETAILED DESCRIPTION OF ILLUSTRATIVE EMBODIMENTS

Embodiments of the invention are based, at least in part, on the discovery of polymer-filler composites prepared from solution mixing cis-1,4-polydiene obtained from guayule with reinforcing filler. These composites are characterized by unexpectedly high bound rubber content and are therefore useful in forming vulcanizable compositions. According to embodiments of the invention, filler is introduced to a guayule cement to form a solution masterbatch, and the solution masterbatch is then desolventized. Without wishing to be bound by any particular theory, the advantageous bound rubber content is believed to derive from unique characteristics of the guayule cement, the use of particular carbon black, the amount of polymer within the cement, and/or the use of particular desolventization techniques. As explained in greater detail below, the polymer-filler composites are used to make vulcanizable rubber compositions. In particular embodiments, these vulcanizable rubber compositions are used in the manufacture of tire components. Because the polymer-filler composites have a high bound filler content, process of forming vulcanizable composition using these composites is advantageously efficient since time and mix energy can be appreciably reduced. Also, the results rubber goods, especially tires, benefit from the increased filler dispersion (e.g. tires will experience reduced wear).

Accordingly, embodiments of the invention provide a method that includes (i) providing a guayule cement, (ii) introducing filler particles to the cement to form a solution masterbatch, and (iii) desolventizing the solution masterbatch to form polymer-filler composites.

Providing a Guayule Cement

As indicated above, a guayule cement is provided. This cement includes polymer obtained from guayule and dissolved in an organic solvent. The polymer is included in the solids portion of the cement, and other constituents, which are disclosed below, may also be included in the solids portion of the cement. The solids portion may include dissolved solids and suspended or dispersed solids.

In one or more embodiments, the guayule cement has a solids concentration of less than 12 wt %, in other embodiments less than 10 wt %, in other embodiments less than 9 wt %, and in other embodiments less than 8 wt %, based on the total weight of the cement. In these or other embodiments, the guayule cement has a solids concentration of greater than 4 wt %, in other embodiments greater than 5 wt %, and in other embodiments greater than 6 wt %, based on the total weight of the cement. In one or more embodiments, the guayule cement has a solids concentration of from about 4 to about 12 wt %, in other embodiments from about 4 to about 10 wt %, in other embodiments from about 5 to about 9 wt %, and in other embodiments from about 6 to about 8 wt %, based on the total weight of the cement.

Guayule Polymer

In one or more embodiments, polymer obtained from guayule (*Parthenium argentatum*), is cis-1,4-polyisoprene, which may be referred to as guayule polymer, guayule polyisoprene, or guayule rubber.

In one or more embodiments, the guayule polymer (i.e. cis-1,4-polyisoprene) may be characterized by a number average molecular weight ($M_n$) of greater than 150, in other embodiments greater than 200, and in other embodiments greater than 225 kg/mol. In one or more embodiments, guayule polymer may have a number average molecular weight ($M_n$) of from about 150 to about 500 kg/mol, in other embodiments from about 200 to about 450 kg/mol, and in other embodiments from about 225 to about 400 kg/mol. In these or other embodiments, the guayule polymer may have a weight average molecular weight ($M_w$) of greater than 800, in other embodiments greater than 900, and in other embodiments greater than 950 kg/mol. In one or more embodiments, guayule polymer may have a weight average molecular weight ($M_w$) of from about 800 to about 3000 kg/mol, in other embodiments from about 900 to about 2000 kg/mol, and in other embodiments from about 950 to about 1500 kg/mol. In one or more embodiments, the guayule polymer has a molecular weight distribution ($M_w/M_n$) of less than 7, in other embodiments less than 6, in yet other embodiments less than 5.5, and in still other embodiments less than 5. In one or more embodiments, guayule polymer may have a molecular weight distribution of from about 3 to about 7, in other embodiments from about 4 to about 6, and in other embodiments from about 4.5 to about 5. The polymer molecular weight ($M_w$ and $M_n$) can be determined by gel permeation chromatography (GPC) using THF as a solvent and polystyrene standards.

In one or more embodiments, the solids portion of the guayule cement includes greater than 85 wt %, in other embodiments greater than 90 wt %, and in other embodiments greater than 95 wt % cis-1,4-polyisoprene, based upon the total weight of the solids portion of the cement. In one or more embodiments, the solids portion of the cement includes from about 85 to about 99 wt %, in other embodiments from about 90 to about 98 wt %, and in other embodiments from about 95 to about 97 wt % cis-1,4-polyisoprene, based on the total weight of the solids portion of the cement.

Other Constituents within Solids Portion of Cement

In one or more embodiments, the solids portion of the guayule cement may include other constituents materials that are found within guayule and materials optionally added to the cement prior to addition of the particulate filler.

In one or more embodiments, those additional constituents within the solids portion of the cement that derive from guayule include guayule resin. As those skilled in the art appreciate, guayule resin generally refers to non-polyisoprene low molecular weight compounds that generally have a molecular weight of less than about 3000 g/mole. Examples of compounds within the resin include, but are not limited to, monoterpenes, triterpenes (Argentatin A, B and C), sesquiterpene compounds (Guayulin A and B) and fatty acids (as free fatty acid, monoglycerides, diglycerides, triglycerides, or a combination thereof). Additionally, solids portion of the cement may include low molecular weight polyisoprene polymers and oligomers.

In one or more embodiments, the solids portion of the guayule cement may be characterized by a relatively low content of guayule resin. For example, the solids content of the guayule cement may include less than 7 wt %, in other embodiments less than 6 wt %, and in other embodiments less than 5 wt % guayule resin or low molecular weight polyisoprene, based upon the total weight of the solids portion of the cement. In one or more embodiments, the solids portion of the cement includes from about 0.5 to about 7 wt %, in other embodiments from about 1 to about 6 wt %, and in other embodiments from about 2 to about 4 wt % guayule resin or low molecular weight polyisoprene, based on the total weight of the solids portion of the cement. In one or more embodiments, the weight ratio of guayule resin to low molecular weight polyisoprene may be from about 0.5:1 to about 1.5:1, in other embodiments from about 0.7:1 to about 1.3:1, and in other embodiments from about 0.9:1 to about 1.1:1.

In one or more embodiments, the solids portion of the guayule cement may include solids added to the cement prior to the addition of the particulate filler. In one or more embodiments, the solids portion of the cement may include an antidegradant such antioxidants and antiozonants. Examples of useful antidegradants include N,N'disubstituted-p-phenylenediamines, such as N-1,3-dimethylbutyl-N'phenyl-p-phenylenediamine (6PPD), N,N'-Bis(1,4-dimethylpentyl)-p-phenylenediamine (77PD), N-phenyl-N-isopropyl-p-phenylenediamine (IPPD), and N-phenyl-N'-(1, 3-dimethylbutyl)-p-phenylenediamine (HPPD). Other examples of antidegradants include, acetone diphenylamine condensation product (Alchem BL), 2,4-trimethyl-1,2-dihydroquinoline (Alchem TMQ), octylated Diphenylamine (Alchem ODPA), and 2,6-di-t-butyl-4-methyl phenol (BHT).

When present, the solids portion of the cement may include less than 1 wt %, in other embodiments less than 0.5 wt %, and in other embodiments less than 0.3 wt % antidegradant, based on the total weight of the solids portion. In one or more embodiments, the solids portion includes from about 0.05 to about 1 wt %, in other embodiments from about 0.07 to about 0.5 wt %, and in other embodiments from about 0.1 to about 0.3 wt % antidegradant, based on the total weight of the solids portion.

Solvent

In one or more embodiments, the guayule cement includes a generally non-polar hydrocarbon solvent, which may be selected from $C_5$ to $C_{10}$ straight chain hydrocarbons, $C_5$ to $C_{10}$ branched chain hydrocarbons, $C_5$ to $C_{10}$ cyclic hydrocarbons, $C_6$ to $C_{10}$ aromatic hydrocarbons, and mixtures thereof. In various embodiments, combinations of solvents, including those that provide an azeotropic mixture, may be employed.

Specific examples of non-polar hydrocarbon solvents include pentane isomers such as n-pentane, iso-pentane, neo-pentane, and mixtures thereof, and hexane isomers such as n-hexane, iso-hexane, 3-methylpentant, 2,3-dimethylbutane, neo-hexane, cyclohexane, and mixtures thereof. Other useful examples include $C_6$ to $C_{10}$ aromatic hydrocarbons such as benzene, toluene, o-xylene, m-xylene, p-xylene, ethylbenzene, 1,2,3-trimethylbenzene, 1,2,4-trimethylbenzene, mesitylene, 2-ethyltoluene, 3-ethyltoluene, 4-ethyltoluene, and mixtures thereof.

In one or more embodiments, the guayule cement includes a mixture of a non-polar hydrocarbon solvent and a polar organic solvent. Useful polar organic solvents include acetone, $C_1$-$C_4$ alcohols, $C_2$-$C_4$ diols, and mixtures thereof. In particular embodiments, the solvent is a mixture of acetone and hexanes. In other particular embodiments, the solvent is a mixture of acetone and iso-hexane. In yet other particular embodiments, the solvent is a mixture of iso-hexane, cyclohexane and acetone.

In one or more embodiments, where the solvent is a mixture of polar and non-polar solvents, the mixture may include less than 50 wt %, in other embodiments less than 40 wt %, in other embodiments less than 30 wt %, and in other embodiments less than 20 wt % polar solvent, with the balance including non-polar solvent. In one or more embodiments, the mixture may include from about 1 to about 50 wt %, in other embodiments from about 10 to about 45 wt %, and in other embodiments from about 20 to about 40 wt % polar solvent with the balance including non-polar solvent.

Obtaining Guayule Polymer

According to embodiments of the present invention, the process of the invention includes obtaining the guayule polymer from a guayule plant. In one or more embodiments, this process may include providing a guayule plant material, mechanically fracturing the plant material, extracting organic material from the fractured plant material to form a miscella, and fractionating the miscella to provide a cement or swollen polymer mass. The swollen polymer mass or cement may then be diluted to provide the cement with the desired solids content.

In one or more embodiments, the step of fracturing the guayule plant may include mechanically rupturing the stems by, for example, chopping, grinding, and/or macerating dried guayule stems. In one or more embodiments, these stems may include less than about 15 wt %, or in other embodiments less than 10 wt % leaves. In these or other embodiments, dried guayule stems include those that contain less than 25 wt %, or in other embodiments from about 5 to about 20 wt % moisture.

In one or more embodiments, the step of extracting the organic material from the fractured plant material includes combining the fractured plant material with a solvent that is adapted to dissolve the organic matter of the fractured plants. In one or more embodiments, the solvent includes a mixture of a hydrocarbon solvent (non-polar) and a polar organic solvent (e.g. 30 wt % acetone and 70 wt % hexanes). Those skilled in the art will be able to readily select an appropriate amount of solvent mixture to combine with the fractured plant material. For example, it may be common to add sufficient solvent to provide a weight ratio of solvent to bagasse of about 2:1 to about 4:1. The organic material that is dissolved in the solvent mixture is referred to as the miscella, and the miscella is then separated from the bagasse, which is the residual woody tissue. The separation of the miscella and the bagasse can be accomplished by using one or more known techniques including a multi-stage extraction technique and/or a countercurrent extraction technique.

Once the miscella is substantially separated from the bagasse, the miscella undergoes the step of fractionating to, among other things, separate those materials that are soluble in polar solvent (e.g. resin) from those constituents that are soluble in non-polar solvent (e.g. cis-1,4-polyisoprene). In one or more embodiments, the fractionating step includes the use of multistage countercurrent fractionation with concomitant addition of polar solvent (e.g. acetone) countercurrent to the flow of the miscella. Countercurrent fractionation and production of a swollen rubber mass is described, for example, in W. W. Schloman Jr., et al., "Processing Guayule for Latex and Bulk Rubber," *Industrial Crops and Products,* 22, 41-47 (2005).

In one or more embodiments, the miscella can be diluted with additional acetone to precipitate the cis-1,4-polyisoprene in the form of a swollen rubber mass. The swollen rubber mass can then be diluted with additional hydrocarbon solvent or a mixture of at least one hydrocarbon solvent and at least one polar organic solvent to produce a cement with a desired solids content.

Forming Solution Masterbatch

Once the desired guayule cement is provided to the process, filler particles are introduced to the cement to form a solution masterbatch. In certain embodiments, additional materials are introduced to the cement in forming the solution masterbatch. The solution masterbatch may be mixed by using conventional techniques for mixing solutions.

Filler Particles

In one or more embodiments, the filler particles added to the cement include reinforcing filler. As those skilled in the art appreciate, reinforcing filler particles include carbon black filler particles. According to embodiments of the invention, carbon black is added in sufficient amounts to provide a desired weight ratio of carbon black to guayule rubber.

Carbon Black

In one or more embodiments, useful carbon blacks include furnace blacks, channel blacks, and lamp blacks. More specific examples of carbon blacks include super abrasion furnace blacks, intermediate super abrasion furnace blacks, high abrasion furnace blacks, fast extrusion furnace blacks, fine furnace blacks, semi-reinforcing furnace blacks, medium processing channel blacks, hard processing channel blacks, conducting channel blacks, and acetylene blacks.

In one or more embodiments, the carbon blacks employed in preparing the solution masterbatch may have a surface area of greater than 100 $m^2$/g, in other embodiments greater than 115 $m^2$/g, and in other embodiments greater than 130 $m^2$/g. In these or other embodiments, the carbon blacks have a surface area of from about 100 to about 200 $m^2$/g, in other embodiments from about 115 to about 175 $m^2$/g, and in other embodiments from about 130 to about 150 $m^2$/g. For purposes of this specification, and unless otherwise specified, carbon black surface area values are reported as N2 surface area determined by ASTM D-6556-19a.

In one or more embodiments, the carbon black that is combined with the guayule cement is unpelletized. In other embodiments, the carbon black is pelletized using conventional carbon black pelletization techniques, and then the carbon black pellets are ground or otherwise mechanically manipulated to achieve a desired particle size (e.g. milled). In yet other embodiments, the carbon black is pelletized to a desired particle size.

In one or more embodiments, the carbon black that is added to the guayule cement is characterized by a median particle size (i.e. D50) of less than 65 nm, in other embodiments less than 60 nm, and in other embodiments less than 55 nm. In these or other embodiments, the carbon black is characterized by a median particle size of greater than 35 nm, in other embodiments greater than 40, and in other embodiments greater than 45 nm. In one or more embodiments, median particle size of the carbon black is from about 35 to about 65 nm, in other embodiments from about 40 to about 60 nm, and in other embodiments from about 45 to about 55 nm.

Characteristics of Solution Masterbatch

In one more embodiments, the solution masterbatch is characterized by a solids content (i.e. the relative weight of the polymer and filler to the overall composition) that is less than 15 wt %, in other embodiments less than 13 wt %, and in other embodiments less than 12 wt %, based on the total weight of the masterbatch. In these or other embodiments, the solids content of the masterbatch is greater than 5 wt %, in other embodiments greater than 7 wt %, and in other embodiments greater than 8 wt %, based on the total weight of the masterbatch. In one or more embodiments, the solids content of the masterbatch is from about 5 to about 15 wt %, in other embodiments from about 7 to about 13 wt %, and in other embodiments from about 8 to about 12 wt %, based on the total weight of the masterbatch.

In one more embodiments, the solution masterbatch may be characterized by the weight of carbon black relative to the weight of the polymer. In one or more embodiments, the solution masterbatch includes less than 90, in other embodiments less than 80, and in other embodiments less than 70 parts by weight carbon black per 100 parts by weight polymer. In these or other embodiments, the solution masterbatch includes greater than 30, in other embodiments greater than 40, and in other embodiments greater than 50 parts by weight carbon black per 100 parts by weight polymer. In one or more embodiments, the solution masterbatch includes from about 30 to about 90, in other embodiments from about 40 to about 80, and in other embodiments from about 50 to about 70 parts by weight carbon black per 100 parts by weight polymer.

Filler Introduction

Several techniques can be employed to introduce the filler to the guayule cement. In one or more embodiments, the filler is introduced directly to the cement in the form of a dry solid particulate. For example, the cement may be contained within a conventional stirred-tank reactor, and the filler can added directly to the cement from the head space of the reactor in the form of a dry solid particulate.

In other embodiments, the filler particles are pre-mixed with a carrier prior to being introduced to the cement. In one or more embodiments, the filler particles are dissolved or dispersed in a solvent to form solution or dispersion, which may be referred to as a filler-solvent mixture, and the filler-solvent mixture is introduced to the cement. For example, where the cement is contained in a conventional stirred-tank reactor, the filler-solvent mixture can be introduced to the cement via the headspace of the reactor, or in the other embodiments, the mixture can be injected into the cement by an inlet located below the liquid level of the reactor or via a conduit extending into the liquid level of the reactor.

In those embodiments where a filler-solvent mixture is formed, the filler-solvent mixture may be characterized by a solids content (i.e. the weight of the filler relative to the total weight of the mixture with the balance including the weight of the solvent) of less than 15 wt %, in other embodiments less than 12 wt %, and in other embodiments less than 10 wt % filler, based on the total weight of the mixture. In these or other embodiments, the mixture may include from about 3 to about 15 wt %, in other embodiments from about 4 to about 12 wt %, and in other embodiments from about 5 to about 10 wt % filler, based on the total weight of the mixture.

Where a filler-solvent mixture is formed, the solvent employed to make the mixture may include a hydrocarbon solvent as described above with respect to the guayule cement. In other embodiments, the solvent may include a blend of hydrocarbon solvent and polar organic solvent (e.g. 30 wt % acetone and 70 wt % hexanes).

Optional Concentrating of Solution Masterbatch

In one or more embodiments, the solution masterbatch is optionally concentrated before direct desolventization. This can be accomplished by employing conventional techniques such as vaporizing some of the solvent by heat and/or pressure manipulation. As the skilled person will recognize, the amount of solvent can be reduced by heating the solution masterbatch to the boiling point (at a given pressure) of at least one of the solvents to thereby vaporize the solvent. In one or more embodiments, the solution masterbatch is heated within CSTR at atmospheric conditions to boil off a portion of the solvent within the masterbatch.

In one or more embodiments, the optional step of concentrating the solution masterbatch reduces the amount of solvent present in the masterbatch by greater than 5 wt %, in other embodiments by greater than 10 wt %, and in other embodiments by greater than 15 wt % based on the total weight of the solvent within the masterbatch. In these or other embodiments, the optional step of concentrating the solution masterbatch reduces the amount of solvent by no more than 60 wt %, in other embodiment by no more than 50 wt %, and in other embodiments by no more than 40 wt % based on the total weight of the solvent within the masterbatch.

In one or more embodiments, the solution masterbatch, after the optional step of concentrating, may be characterized by a solids content (i.e. the relative weight of the polymer and filler to the overall composition, which includes the solvent) of less than 20 wt %, in other embodiments less than 18 wt %, and in other embodiments less than 15 wt % solids based on the total weight of the masterbatch. In these or other embodiments, the solution masterbatch, after the optional step of concentrating, may be characterized by a solids content of greater than 8 wt %, in other embodiments greater than 10 wt %, and in other embodiments greater than 12 wt % solids, based on the total weight of the masterbatch. In one or more embodiments, the solution masterbatch, after the optional step of concentrating, may be characterized by a solids content of from about 8 to about 20 wt %, in other embodiments from about 10 to about 18 wt %, and in other embodiments from about 12 to about 15 wt % solids, based on the total weight of the masterbatch.

Direct Desolventization

As indicated above, the solution masterbatch is desolventized to form a polymer-filler composite, which may also be referred to as rubber-filler composite, or simply as a composite. According to embodiments of the invention, the solution masterbatch is directly desolventized, which refers to a process whereby the solvent is separated from the solids portion of the masterbatch (i.e. separated from the polymer and filler) to form a composition that is substantially a solid composite of the polymer and filler. This can be distinguished from indirect desolventization methods such as steam desolventization whereby water is added to drive off the solvent and thereby produce a composition that would include water, polymer, and filler.

Direct desolventization techniques, as well as the equipment for performing these methods, are generally known in the art. For example, the temperature of the solution masterbatch can be increased or maintained at a temperature sufficient to volatize the solvent. Also, the pressure within the vessel in which the desolventization is conducted can be decreased, which will assist in the volatilization of solvent.

Still further, the solution masterbatch can be agitated, which may further assist in the removal of solvent from the masterbatch. In one embodiment, a combination of heat, decreased pressure, and agitation can be employed.

In one embodiment, the temperature of the solution masterbatch, together with the pressure of the environment in which the solution masterbatch is devolatilized (i.e. within the desolventization vessel) is adjusted to promote devolatilization. For example, the desolventization step may take place at a temperature of greater than 35° C., in other embodiments greater than 37° C., in other embodiments greater than 40° C., in other embodiments greater than 50° C., in other embodiments greater than 75° C., in other embodiments greater than 100° C., in other embodiments greater than 110° C., and in other embodiments greater than 120° C. under pressures of from about −5 to about −30 mm Hg. In one or more embodiments, the step of desolventization takes place at a temperature of from about 35 to about 160° C., in other embodiments from about 37 to about 140° C., and in other embodiments from about 40 to about 130° C. under pressures of from about −5 to about −30 mm Hg.

In one or more embodiments, a threshold amount of work is delivered to the solution masterbatch during the step of desolventization. As the skilled person will appreciate, work can be imparted to the composition by mixing and masticating the composition while subjecting the composition to conditions (such as elevated temperature and/or reduced pressure) that will cause volatilization of the solvent.

Various techniques can be employed to agitate and/or impart shear on the solution masterbatch during desolventization. As the skilled person will appreciate, agitation can expose greater surface area and thereby facilitate the evolution of solvent. It has also been unexpectedly discovered that shear energy imparted on the solution masterbatch during desolventization has a direct impact on bound rubber.

In one embodiment, a devolatizer can be employed as the vessel in which the step of desolventization is conducted. Devolatizers can include a devolatizing extruder, which typically includes a screw apparatus that can be heated by an external heating jacket. These extruders are known in the art and may include single and twin screw extruders.

Alternatively, devolatizers can include an extruder-like apparatus that includes a shaft having paddles attached thereto. An extruder-like apparatus can include a single shaft or multiple shafts. The shaft can be axial to the length of the apparatus and the flow of the solution masterbatch through the device/vessel. The composition (i.e. solution masterbatch) may be forced through the apparatus by using a pump, and the shaft rotates to thereby allow the paddles to agitate the composition and assist in the evolution of solvent. The paddles can be angled so as to assist movement of the composition through the devolatilizer, although movement of the composition through the devolatilizer can be facilitated by the pump that can direct the composition into the devolatilizer and may optionally be further assisted by an extruder that may optionally be attached in series or at the end of the devolatilizer (i.e., the extruder helps pull the composition through the devolatilizer).

Devolatilizers can further include backmixing vessels. In general, these backmixing vessels include a single shaft that includes a blade that can be employed to vigorously mix and masticate the composition (i.e. the solution masterbatch).

In certain embodiments, combinations of the various devolatilizing equipment can be employed to achieve desired results. These combinations can also include the use of extruders. In one example, a single shaft "extruder-like" devolatilizer (e.g., one including paddles) can be employed in conjunction with a twin-screw extruder. In this example, the solution masterbatch first enters the "extruder-like" devolatilizer followed by the twin-screw extruder. The twin-screw extruder advantageously assists in pulling the composition through the devolatilizer. The paddles of the devolatilizer can be adjusted to meet conveyance needs.

In another example, a twin shaft "extruder-like" devolatilizer can be employed. In certain embodiments, the paddles on each shaft may be aligned so as to mesh with one another as they rotate. The rotation of the shafts can occur in the same direction or in opposite directions.

In yet another example, a backmixing volatilizing vessel can be followed by a twin-screw extruder, which can then be followed by a twin shaft extruder-like devolatilizing vessel, which can then be following by a twin screw extruder.

Devolatilizing equipment is known in the art and commercially available. For example, devolatilizing equipment can be obtained from LIST (Switzerland); Coperion Werner & Phleiderer; or NFM Welding Engineers, Inc. (Ohio). Exemplary equipment available from LIST include DISCOTHERM™, which is a single shaft "extruder-like" devolatilizer including various mixing/kneading bars or paddles; CRP™, which is a dual shaft "extruder-like" devolatilizer wherein each shaft correlates with the other; ORP™, which is a dual shaft devolatilizer wherein each shaft rotates in an opposite direction to the other.

Characteristics of Rubber-Filler Composites
Bound Rubber

The rubber-filler composites of the present invention are characterized by an advantageous bound rubber content. In one or more embodiments, the polymer-filler agglomerates have a bound filler content that is greater than 40%, in other embodiments greater than 45%, and in other embodiments greater than 50%. In these or other embodiments, the polymer-filler agglomerates are characterized by a bound filler content of from about 40 to about 70%, in other embodiments from about 45 to about 65%, and in other embodiments from about 50 to about 60%.

For purposes of this specification, and unless otherwise indicated, the following test is used to determine the percent of polymer bound to filler particles in each rubber composition. Bound rubber was measured by immersing small pieces of uncured stocks in a large excess of toluene for three days. The soluble rubber was extracted from the sample by the solvent. After three days, any excess toluene was drained off and the sample was air dried and then dried in an oven at approximately 100° C. to a constant weight. The remaining pieces form a weak coherent gel containing the filler and some of the original rubber. The amount of rubber remaining with the filler is the bound rubber. The bound rubber content is then calculated according to the following:

$$\% \text{ Bound Rubber} = 100(Wd-F)/R$$

where $Wd$ is the weight of dried gel, $F$ is the weight of filler in gel or solvent insoluble matter (same as weight of filler in original sample), and $R$ is the weight of polymer in the original sample. The bound rubber percentage provides a means of measuring the interaction between the rubber (polymer) within a rubber composition and the filler, with relatively higher percentages of bound rubber indicating increased and beneficial interaction between the rubber (polymer) and filler.

Data corresponding to "Bound rubber" can be determined using the procedure described by J. J. Brennan et al., Rubber Chem. and Tech., 40, 817 (1967).

Vulcanizable Composition

According the present invention, the polymer-filler agglomerates prepared as described above are used in the preparation of vulcanizable compositions, which when cured form the rubber vulcanizates. In addition to the polymer-filler agglomerates, the vulcanizable compositions may also include other constituents such as, but not limited to, synthetic elastomeric polymers or non-guayule natural rubber, reinforcing fillers, plasticizers, and curatives. Specific examples of these ingredients include, but not limited to, carbon black, silica, fillers, oils, resins, waxes, metal carboxylates, cure agents and cure coagents, anti-degradants, and metal oxides.

Exemplary elastomeric polymers that are useful in the practice of the present invention (i.e. included within the vulcanizable compositions), which may also be referred to as rubber polymers or vulcanizable polymers, include polydienes and polydiene copolymers. Specific examples of these polymer include, but are not limited to, polybutadiene, poly(styrene-co-butadiene), polyisoprene, poly(styrene-co-isoprene), and functionalized derivatives thereof. Other polymers that may be included in the polymer sample include neoprene, poly(ethylene-co-propylene), poly(styrene-co-butadiene), poly(ethylene-co-propylene-co-diene), polysulfide rubber, acrylic rubber, urethane rubber, silicone rubber, epichlorohydrin rubber, syndiotactic polybutadiene, and mixtures thereof or with polydienes and polydiene copolymers. These elastomers can have a myriad of macromolecular structures including linear, branched, and star-shaped structures. These elastomers may also include one or more functional units, which typically include heteroatoms tethered to the backbone of the polymer.

In one or more embodiments, useful carbon blacks include furnace blacks, channel blacks, and lamp blacks. More specific examples of carbon blacks include super abrasion furnace blacks, intermediate super abrasion furnace blacks, high abrasion furnace blacks, fast extrusion furnace blacks, fine furnace blacks, semi-reinforcing furnace blacks, medium processing channel blacks, hard processing channel blacks, conducting channel blacks, and acetylene blacks.

In one or more embodiments, suitable silica fillers include precipitated amorphous silica, wet silica (hydrated silicic acid), dry silica (anhydrous silicic acid), fumed silica, calcium silicate, aluminum silicate, calcium aluminum silicate, magnesium silicate, and the like.

In one or more embodiments, the surface area of the silica, as measured by the BET method, may be from about 32 to about 400 $m^2/g$ (including 32 $m^2/g$ to 400 $m^2/g$), with the range of about 100 $m^2/g$ to about 300 $m^2/g$ (including 100 $m^2/g$ to 300 $m^2/g$) being preferred, and the range of about 150 $m^2/g$ to about 220 $m^2/g$ (including 150 $m^2/g$ to 220 $m^2/g$) being included. In one or more embodiments, the silica may be characterized by a pH of about 5.5 to about 7 or slightly over 7, or in other embodiments from about 5.5 to about 6.8. Some of the commercially available silica fillers that can be used include, but are not limited to, those sold under the tradename Hi-Sil, such as 190, 210, 215, 233, and 243, by PPG Industries, as well as those available from Degussa Corporation (e.g., VN2, VN3), Rhone Poulenc (e.g., Zeosil™ 1165 MP), and J. M. Huber Corporation.

In one or more embodiments, silica coupling agents are included in the vulcanizable composition. As the skilled person appreciates, these compounds include a hydrolyzable silicon moiety (often referred to as a silane) and a moiety that can react with a vulcanizable polymer.

Suitable silica coupling agents include, for example, those containing groups such as alkyl alkoxy, mercapto, blocked mercapto, sulfide-containing (e.g., monosulfide-based alkoxy-containing, disulfide-based alkoxy-containing, tetrasulfide-based alkoxy-containing), amino, vinyl, epoxy, and combinations thereof. In certain embodiments, the silica coupling agent can be added to the rubber composition in the form of a pre-treated silica; a pre-treated silica has been pre-surface treated with a silane prior to being added to the rubber composition.

Non-limiting examples of alkyl alkoxysilanes suitable for use in certain embodiments of the fourth embodiment disclosed herein include, but are not limited to, octyltriethoxysilane, octyltrimethoxysilane, trimethylethoxysilane, cyclohexyltriethoxysilane, isobutyltriethoxy-silane, ethyltrimethoxysilane, cyclohexyl-tributoxysilane, dimethyldiethoxysilane, methyltriethoxysilane, propyltriethoxysilane, hexyltriethoxysilane, heptyltriethoxysilane, nonyltriethoxysilane, decyltriethoxysilane, dodecyltriethoxysilane, tetradecyltriethoxysilane, octadecyltriethoxysilane, methyloctyldiethoxysilane, dimethyldimethoxysilane, methyltrimethoxysilane, propyltrimethoxysilane, hexyltrimethoxysilane, heptyltrimethoxysilane, nonyltrimethoxysilane, decyltrimethoxysilane, dodecyltrimethoxysilane, tetradecyltrimethoxysilane, octadecyl-trimethoxysilane, methyloctyl dimethoxysilane, and mixtures thereof.

Non-limiting examples of bis(trialkoxysilylorgano)polysulfides suitable for use in certain embodiments of the fourth embodiment disclosed herein include bis(trialkoxysilylorgano) disulfides and bis(trialkoxysilylorgano)tetrasulfides. Specific non-limiting examples of bis(trialkoxysilylorgano) disulfides suitable for use in certain exemplary embodiments of the fourth embodiment disclosed herein include, but are not limited to, 3,3'-bis(triethoxysilylpropyl) disulfide, 3,3'-bis(trimethoxysilylpropyl)disulfide, 3,3'-bis(tributoxysilylpropyl)disulfide, 3,3'-bis(tri-t-butoxysilylpropyl)disulfide, 3,3'-bis(trihexoxysilylpropyl)disulfide, 2,2'-bis(dimethylmethoxysilylethyl)disulfide, 3,3'-bis(diphenylcyclohexoxysilylpropyl)disulfide, 3,3'-bis(ethyl-di-sec-butoxysilylpropyl)disulfide, 3,3'-bis(propyldiethoxysilylpropyl)disulfide, 12,12'-bis(triisopropoxysilylpropyl)disulfide, 3,3'-bis(dimethoxyphenylsilyl-2-methylpropyl)disulfide, and mixtures thereof. Non-limiting examples of bis(trialkoxysilylorgano) tetrasulfide silica coupling agents suitable for use in certain embodiments of the fourth embodiment disclosed herein include, but are not limited to, bis(3-triethoxysilylpropyl) tetrasulfide, bis(2-triethoxysilylethyl) tetrasufide, bis(3-trimethoxysilylpropyl)tetrasulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilyl-N,N-dimethylthiocarbamoyl tetrasulfide, 3-trimethoxysilylpropyl-benzothiazole tetrasulfide, 3-triethoxysilylpropylbenzothiazole tetrasulfide, and mixtures thereof. Bis(3-triethoxysilylpropyl)tetrasulfide is sold under the tradename Si 69 by Evonik Degussa Corporation.

Non-limiting examples of mercapto silanes suitable for use in certain embodiments of the fourth embodiment disclosed herein include, but are not limited to, 1-mercaptomethyltriethoxysilane, 2-mercaptoethyltriethoxysilane, 3-mercaptopropyltriethoxysilane, 3-mercaptopropylmethyldiethoxysilane, 2-mercaptoethyltripropoxysilane, 18-mercaptooctadecyldiethoxychlorosilane, and mixtures thereof.

Non-limiting examples of blocked mercapto silanes suitable for use in certain embodiment of the fourth embodiment disclosed herein include, but are not limited to, those described in U.S. Pat. Nos. 6,127,468; 6,204,339; 6,528, 673; 6,635,700; 6,649,684; and 6,683,135, the disclosures of which are hereby incorporated by reference. Representative examples of the blocked mercapto silanes for use herein in certain exemplary embodiments disclosed herein include, but are not limited to, 2-triethoxysilyl-1-ethylthioacetate; 2-trimethoxysilyl-1-ethylthioacetate; 2-(methyldimethoxysilyl)-1-ethylthioacetate; 3-trimethoxysilyl-1-propylthioacetate; triethoxysilylmethyl-thioacetate; trimethoxysilylmethylthioacetate; triisopropoxysilylmethylthioacetate; methyldiethoxysilylmethylthioacetate; methyldimethoxysilylmethylthioacetate; methyldiisopropoxysilylmethylthioacetate; dimethylethoxysilylmethylthioacetate; dimethylmethoxysilylmethylthioacetate; dimethylisopropoxysilylmethylthioacetate; 2-triisopropoxysilyl-1-ethylthioacetate; 2-(methyldiethoxysilyl)-1-ethylthioacetate, 2-(methyldiisopropoxysilyl)-1-ethylthioacetate; 2-(dimethylethoxysilyl-1-ethylthioacetate; 2-(dimethylmethoxysilyl)-1-ethylthioacetate; 2-(dimethylisopropoxysilyl)-1-ethylthioacetate; 3-triethoxysilyl-1-propylthioacetate; 3-triisopropoxysilyl-1-propylthioacetate; 3-methyldiethoxysilyl-1-propyl-thioacetate; 3-methyldimethoxysilyl-1-propylthioacetate; 3-methyldiisopropoxysilyl-1-propylthioacetate; 1-(2-triethoxysilyl-1-ethyl)-4-thioacetylcyclohexane; 1-(2-triethoxysilyl-1-ethyl)-3-thioacetylcyclohexane; 2-triethoxysilyl-5-thioacetylnorbornene; 2-triethoxysilyl-4-thioacetylnorbornene; 2-(2-triethoxysilyl-1-ethyl)-5-thioacetylnorbornene; 2-(2-triethoxy-silyl-1-ethyl)-4-thioacetylnorbornene; 1-(1-oxo-2-thia-5-triethoxysilylphenyl)benzoic acid; 6-triethoxysilyl-1-hexylthioacetate; 1-triethoxysilyl-5-hexylthioacetate; 8-triethoxysilyl-1-octylthioacetate; 1-triethoxysilyl-7-octylthioacetate; 6-triethoxysilyl-1-hexylthioacetate; 1-triethoxysilyl-5-octylthioacetate; 8-trimethoxysilyl-1-octylthioacetate; 1-trimethoxysilyl-7-octylthioacetate; 10-triethoxysilyl-1-decylthioacetate; 1-triethoxysilyl-9-decylthioacetate; 1-triethoxysilyl-2-butylthioacetate; 1-triethoxysilyl-3-butylthioacetate; 1-triethoxysilyl-3-methyl-2-butylthioacetate; 1-triethoxysilyl-3-methyl-3-butylthioacetate; 3-trimethoxysilyl-1-propylthiooctanoate; 3-triethoxysilyl-1-propyl-1-propylthiopalmitate; 3-triethoxysilyl-1-propylthiooctanoate; 3-triethoxysilyl-1-propylthiobenzoate; 3-triethoxysilyl-1-propylthio-2-ethylhexanoate; 3-methyldiacetoxysilyl-1-propylthioacetate; 3-triacetoxysilyl-1-propylthioacetate; 2-methyldiacetoxysilyl-1-ethylthioacetate; 2-triacetoxysilyl-1-ethylthioacetate; 1-methyldiacetoxysilyl-1-ethylthioacetate; 1-triacetoxysilyl-1-ethylthioacetate; tris-(3-triethoxysilyl-1-propyl)trithiophosphate; bis-(3-triethoxysilyl-1-propyl)methyldithiophosphonate; bis-(3-triethoxysilyl-1-propyl)ethyldithiophosphonate; 3-triethoxysilyl-1-propyldimethylthiophosphinate; 3-triethoxysilyl-1-propyldiethylthiophosphinate; tris-(3-triethoxysilyl-1-propyl)tetrathiophosphate; bis-(3-triethoxysilyl-1-propyl)methyltrithiophosphonate; bis-(3-triethoxysilyl-1-propyl)ethyltrithiophosphonate; 3-triethoxysilyl-1-propyldimethyldithiophosphinate; 3-triethoxysilyl-1-propyldiethyldithiophosphinate; tris-(3-methyldimethoxysilyl-1-propyl)trithiophosphate; bis-(3-methyldimethoxysilyl-1-propyl)methyldithiophosphonate; bis-(3-methyldimethoxysilyl-1-propyl)-ethyldithiophosphonate; 3-methyldimethoxysilyl-1-propyldimethylthiophosphinate; 3-methyldimethoxysilyl-1-propyldiethylthiophosphinate; 3-triethoxysilyl-1-propylmethylthiosulfate; 3-triethoxysilyl-1-propylmethanethiosulfonate; 3-triethoxysilyl-1-propyl-ethanethiosulfonate; 3-triethoxysilyl-1-propylbenzenethiosulfonate; 3-triethoxysilyl-1-propyltoluenethiosulfonate; 3-triethoxysilyl-1-propylnaphthalenethiosulfonate; 3-triethoxysilyl-1-propylxylenethiosulfonate; triethoxysilyl methyl methylthiosulfate; triethoxysilylmethylmethanethiosulfonate; triethoxysilylmethylethanethiosulfonate; triethoxysilylmethylbenzenethiosulfonate; triethoxysilylmethyltoluenethiosulfonate; triethoxysilylmethylnaphthalenethiosulfonate; triethoxysilylmethylxylenethiosulfonate, and the like. Mixtures of various blocked mercapto silanes can be used. A further example of a suitable blocked mercapto silane for use in certain exemplary embodiments is that sold under the tradename NXT silane (3-octanoylthio-1-propyltriethoxysilane) by Momentive Performance Materials Inc.

In one or more embodiments, plasticizers include oils and solids resins. Useful oils or extenders that may be employed include, but are not limited to, aromatic oils, paraffinic oils, naphthenic oils, vegetable oils other than castor oils, low PCA oils including MES, TDAE, and SRAE, and heavy naphthenic oils. Suitable low PCA oils also include various plant-sourced oils such as can be harvested from vegetables, nuts, and seeds. Non-limiting examples include, but are not limited to, soy or soybean oil, sunflower oil, safflower oil, corn oil, linseed oil, cotton seed oil, rapeseed oil, cashew oil, sesame oil, camellia oil, jojoba oil, macadamia nut oil, coconut oil, and palm oil. As is generally understood in the art, oils refer to those compounds that have a viscosity that is relatively low compared to other constituents of the vulcanizable composition, such as the resins. In one or more embodiments, the resins may be solids with a Tg of greater than about 20° C., and may include, but are not limited to, hydrocarbon resins such as cycloaliphatic resins, aliphatic resins, aromatic resins, terpene resins, and combinations thereof. Useful resins include, but are not limited to, styrene-alkylene block copolymers, thermoplastic resins such as $C_5$-based resins, $C_5$-$C_9$-based resins, $C_9$-based resins, terpene-based resins, terpene-aromatic compound-based resins, rosin-based resins, dicyclopentadiene resins, alkylphenol-based resins, and their partially hydrogenated resins.

In one or more embodiments, the vulcanizable compositions of this invention include a cure system. The cure system includes a curative, which may also be referred to as a crosslinking agent, rubber curing agent or vulcanizing agents. Curing agents are described in Kirk-Othmer, ENCYCLOPEDIA OF CHEMICAL TECHNOLOGY, Vol. 20, pgs. 365-468, (3rd Ed. 1982), particularly *Vulcanization Agents and Auxiliary Materials*, pgs. 390-402, and A. Y. Coran, *Vulcanization*, ENCYCLOPEDIA OF POLYMER SCIENCE AND ENGINEERING, ($2^{nd}$ Ed. 1989), which are incorporated herein by reference. In one or more embodiments, useful cure systems include sulfur or sulfur-based cross-linking agents, organic peroxide-based crosslinking agents, inorganic crosslinking agents, polyamines crosslinking agents, resin crosslinking agents, oxime-based and nitrosamine-based cross-linking agents, and the like. Examples of suitable sulfur crosslinking agents include "rubbermaker's" soluble sulfur; sulfur donating vulcanizing agents, such as an amine disulfide, polymeric polysulfide or sulfur olefin adducts; and insoluble polymeric sulfur. In other embodiments, the crosslinking agents include sulfur and/or sulfur-containing compounds. In other embodiments, the crosslinking agent excludes sulfur and/or sulfur-containing compounds. Vulcanizing agents may be used alone or in combination.

Other ingredients that are typically employed in rubber compounding may also be added to the rubber compositions. These include accelerators, accelerator activators, additional plasticizers, waxes, scorch inhibiting agents, processing aids, zinc oxide, tackifying resins, reinforcing or hardening resins, fatty acids such as stearic acid, peptizers, and antidegradants such as antioxidants and antiozonants.

Ingredient Amounts

The vulcanizable compositions can be characterized by the total polymeric content (i.e. polymer introduced via polymer-filler agglomerates and polymer elastomer added to the vulcanizable composition). In one or more embodiments, the vulcanizable compositions include greater than 20 wt %, in other embodiments greater than 30 wt %, and in other embodiments greater than 40 wt % polymeric content (e.g. elastomer), based on the total weight of the vulcanizable composition. In these or other embodiments, the vulcanizable compositions include less than 80 wt %, in other embodiments less than 70 wt %, and in other embodiments less than 60 wt % polymeric content (e.g. elastomer), based on the total weight of the vulcanizable composition. In one or more embodiments, the vulcanizable compositions include from about 20 to about 80 wt %, in other embodiments from about 30 to about 70 wt %, and in other embodiments from about 40 to about 60 wt % polymeric content (e.g. elastomer), based on the total weight of the vulcanizable composition polymeric content (e.g. elastomer), based on the total weight of the vulcanizable composition.

In one or more embodiments, the vulcanizable compositions include a filler such as carbon black or silica. In one or more embodiments, the vulcanizable compositions include greater than 10 parts by weight (pbw), in other embodiments greater than 35 pbw, and in other embodiments greater than 55 pbw filler (e.g. carbon black and or silica) per one hundred parts by weight of the rubber (phr). In these or other embodiments, the vulcanizable compositions include less than 140 pbw, in other embodiments less than 95 pbw, and in other embodiments less than 75 pbw filler phr. In one or more embodiments, the vulcanizates include from about 10 to about 200 pbw, in other embodiments from about 10 to about 140 pbw, in other embodiments from about 35 to about 95 pbw, in other embodiments from about 40 to about 130 pbw, in other embodiments from about 50 to about 120 pbw, and in other embodiments from about 55 to about 75 pbw filler (e.g. carbon black and or silica) phr. Carbon black and silica may be used in conjunction at a weight ratio of silica to carbon black of from about 0.1:1 to about 30:1, in other embodiments of from about 0.5 to about 20:1, and in other embodiments from about 1:1 to about 10:1.

In one or more embodiments, where silica is used as a filler, the vulcanizable compositions may include silica coupling agent. In one or more embodiments, the vulcanizable compositions may generally include greater than 1, in other embodiments greater than 2, and in other embodiments greater than 3 pbw silica coupling agent phr. In these or other embodiments, the vulcanizable compositions may generally include less than 40, in other embodiments less than 20, and in other embodiments less than 10 pbw silica coupling agent phr. In one or more embodiments, the vulcanizable compositions include from about 1 to about 40 pbw, in other embodiments from about 2 to about 20 pbw, in other embodiments from about 2.5 to about 15 pbw, and in other embodiments from about 3 to about 10 pbw silica coupling agent phr.

In these or other embodiments, the amount of silica coupling agent may be defined relative to the weight of the silica. In one or more embodiments, the amount of silica coupling agent introduced to the silica (either in situ or pre-reacted) is from about 1 to about 25 pbw, in other embodiments from about 2 to about 20 pbw, and in other embodiments from about 3 to about 15 pbw silica coupling agent per one hundred parts by weight of the silica.

The vulcanizable compositions may generally include greater than 5, in other embodiments greater than 10, and in other embodiments greater than 20 pbw plasticizer (e.g. oils and solid resins) phr. In these or other embodiments, the vulcanizable compositions may generally include less than 80, in other embodiments less than 70, and in other embodiments less than 60 pbw plasticizer phr. In one or more embodiments, vulcanizable compositions may generally include from about 5 to about 80, in other embodiments from about 10 to about 70, and in other embodiments from about 20 to about 60 pbw plasticizer phr. In further embodiments, the vulcanizable compositions may include less than 15 pbw, alternatively less than 10 pbw, or less than 5 pbw of liquid plasticizer. In certain embodiments, the vulcanizable compositions are devoid of liquid plasticizer. In alternative embodiments, the vulcanizable compositions may include at least 20 pbw of resin, at least 25 pbw resin or at least 30 pbw resin.

The skilled person will be able to readily select the amount of vulcanizing agents to achieve the level of desired cure. In particular embodiments, sulfur is used as the cure agent. In one or more embodiments, the vulcanizable compositions may include greater than 0.5, in other embodiments greater than 1, and in other embodiments greater than 2 pbw sulfur phr. In these or other embodiments, the vulcanizable compositions may generally include less than 10, in other embodiments less than 7, and in other embodiments less than 5 pbw sulfur phr. In one or more embodiments, the vulcanizable compositions may generally include from about 0.5 to about 10, in other embodiments from about 1 to about 6, and in other embodiments from about 2 to about 4 pbw sulfur phr.

Preparation of Vulcanizate

In one or more embodiments, the vulcanizate is prepared by vulcanizing a vulcanizable composition. The vulcanizable compositions are otherwise prepared using conventional mixing techniques. The vulcanizable composition is then formed into a green vulcanizate and then subjected to conditions to effect curing (i.e. crosslinking) of the polymeric network.

For example, all ingredients of the vulcanizable compositions can be mixed with standard mixing equipment such as Banbury or Brabender mixers, extruders, kneaders, and two-rolled mills. In one or more embodiments, this may include a multi-stage mixing procedure where the ingredients are introduced and/or mixed in two or more stages. For example, in a first stage (which is often referred to as a masterbatch mixing stage), the polymer-filler agglomerates of this invention, together with optional additional filler and optional ingredients are mixed. In one or more embodiments, where a silica coupling agent is used, it too may be added during one or more masterbatch stages. Generally speaking, masterbatch mixing steps include those steps where an ingredient is added and mixing conditions take place at energies (e.g. temperature and shear) above that which would scorch the composition in the presence of a curative. Similarly, re-mill mixing stages take place at the same or similar energies except an ingredient is not added during a re-mill mixing stage. It is believed that the energies imparted to the vulcanizable composition during masterbatch or re-mill mixing is sufficient to disperse the filler and to cause hydrolysis and subsequent condensation of the hydrolyzable groups. For example, it is believed that during one or more of these mix stages, the hydrolyzable groups of the silica functionalizing agents hydrolyze and then, via a condensation reaction, bond to the silica particles. To this end, in one or more embodiments, masterbatch or re-mill mixing may take place in presence of a catalyst that serves to promote the reaction between the hydrolyzable groups and the silica. These catalysts are generally known in the art and include, for example, strong bases such as, but not limited to, alkali metal alkoxides, such as sodium or potassium alkoxide; guanidines, such as triphenylguanidine, diphenylguanidine, di-o-tolylguanidine, N,N,N',N'-tetramethylguanidine, and the like; and hindered amine bases, such as 1,8-diazabicyclo[5.4.0]undec-7-ene, 1,5-diazabicyclo[4.3.0]non-5-ene, and the like, tertiary amine catalysts, such as N,N-dimethylcyclohexylamine, triethylenediamine, triethylamine, and the like, quaternary ammonium bases, such as tetrabutylammonium hydroxide, and bisaminoethers, such as bis(dimethylaminoethyl)ethers.

Accordingly, masterbatch and re-mill mixing takes place in the absence of the curative and proceed at temperatures above which the curing would otherwise take place if the curative was present. For example, this mixing can take place at temperatures in excess of 120° C., in other embodiments in excess of 130° C., in other embodiments in excess of 140° C., and in other embodiments in excess of 150° C.

Once the masterbatch is prepared, the vulcanizing agents may be introduced and mixed into the masterbatch in a final mixing stage, which is typically conducted at relatively low temperatures so as to reduce the chances of premature vulcanization. For example, this mixing may take place at temperatures below 120° C., in other embodiments below 110° C., in other embodiments below 100° C. Additional mixing stages, sometimes called remills, can be employed between the masterbatch mixing stage and the final mixing stage.

In one or more embodiments, a sulfur-based cure system is employed. The sulfur-based cure system is capable of forming monosulfide, disulfide or polysulfide covalently-bonded bridges between two chains, by reaction with unsaturations initially present in said chains. In one or more embodiments, the crosslinking agent includes sulfur, a sulfur-donating compound, a metal oxide, a bismaleimide, or a benzoquinone derivative. Examples of crosslinking agents include sulfur, dimorpholine disulfide, alkyl phenol disulfide, zinc and magnesium oxides, benzoquinone dioxime and m-phenylenebismaleimide. The curing package may further include one or more vulcanization aids, such as accelerators, retardants, synergists, fillers, heat stabilizers, radiation stabilizers, short-stoppers and moderating agents.

The skilled person will be able to readily select the amount of vulcanizing agents to achieve the level of desired cure. Also, the skilled person will be able to readily select the amount of cure accelerators to achieve the level of desired cure.

INDUSTRIAL APPLICABILITY

As indicated above, the vulcanizable compositions of the present invention can be cured to prepare various tire components. These tire components include, without limitation, tire treads, tire sidewalls, belt skims, innerliners, ply skims, and bead apex. These tire components can be included within a variety of vehicle tires including passenger tires.

In particular embodiments, the vulcanizates of this invention include one or more components of a heavy vehicle tire, such as a tread or undertread of a heavy vehicle tire. As those skilled in the art appreciate, heavy vehicle tires include, for example, truck tires, bus tires, TBR (truck and bus tires), subway train tires, tractor tires, trailer tires, aircraft tires, agricultural tires, earthmover tires, and other off-the-road (OTR) tires. In one or more embodiments, the heavy vehicle tires may new tires as well as those tires that have been re-treaded. Heavy vehicle tires can sometimes be classified as to their use. For example, truck tires may be classified as drive tires (those that are powered by the truck engine) and steer tires (those that are used to steer the truck). The tires on the trailer of a tractor-trailer rig are also classified separately.

In particular embodiments, heavy vehicle tires are relatively large tires. In one or more embodiments, the heavy vehicle tires have an overall diameter (tread to tread) of greater than 17.5, in other embodiments greater than 20, in other embodiments greater than 25, in other embodiments greater than 30, in other embodiments greater than 40, and in other embodiments greater than 55 inches. In these or other embodiments, heavy vehicle tires have a section width of greater than 10, in other embodiments greater than 1.1, in other embodiments greater than 12, and in other embodiments great than 14 inches.

Various modifications and alterations that do not depart from the scope and spirit of this invention will become apparent to those skilled in the art. This invention is not to be duly limited to the illustrative embodiments set forth herein.

The invention claimed is:

1. A method for forming a polymer-filler composite having advantageous bound filler content, the method comprising:
   (a) providing a guayule cement, where the guayule cement includes a mixture of a non-polar solvent and a polar organic solvent, and where the solids portion of the guayule cement includes from about 0.5 to about 7 wt % guayule resin or low molecular weight polyisoprene;
   (b) introducing particulate filler to the guayule cement to form a solution masterbatch; and
   (c) desolventizing the solution masterbatch to form a polymer-filler composite.

2. The method of claim 1, where the guayule cement includes less than 12 wt % polymer.

3. The method of claim 1, where the particulate filler is carbon black.

4. The method of claim 1, where carbon black is dispersed in a carrier solvent prior to said step of introducing carbon black to the guayule cement.

5. The method of claim 1, where the carbon black solid particulate has a median particle size (i.e. D50) of less than 65 nm.

6. The method of claim 1, where the carbon black solid particulate has a surface area of greater than 100 m$^2$/g.

7. The method of claim 1, where the carbon black is non-pelletized.

8. The method of claim 1, where said step of desolventizing includes direct desolventizing techniques.

9. The method of claim 1, where the solution masterbatch undergoes shear mixing during said step of desolventizing.

10. The method of claim 1, where the guayule cement includes a solids portion including cis-1,4-polyisoprene obtained from guayule.

11. The method of claim 1, where the guayule cement includes a solids portion including resin obtained from guayule.

12. The method of claim 1, where the solids portion of the guayule cement includes greater than 85 wt % cis-1,4-polyisoprene obtained from guayule.

13. The method of claim 1, where the guayule cement includes a hydrocarbon solvent.

14. The method of claim 1, where the polymer-filler composites have a bound rubber content of greater than 40%.

15. The method of claim 1, where the polar organic solvent is selected from the group consisting of acetone, $C_1$-$C_4$ alcohols, $C_2$-$C_4$ diols, and mixtures thereof.

16. The method of claim 1, where the mixture includes from about 1 to about 50 wt % polar solvent with the balance including non-polar solvent.

17. A method for forming a vulcanizable composition, the method comprising:
   combining the polymer-filler composite of claim 1 with a curative.

18. The method for forming a vulcanizable composition of claim 17, where the method further includes mixing the polymer-filler composite with a synthetic elastomer.

19. The method of claim 1, where the solution masterbatch has a total solids content of from about 5 to about 15 wt %.

20. The method of claim 19, where the solution masterbatch includes from about 30 to about 90 parts by weight carbon black per 100 parts by weight polymer.

* * * * *